US010286684B2

United States Patent
Schach et al.

(10) Patent No.: US 10,286,684 B2
(45) Date of Patent: May 14, 2019

(54) PRINTING DEVICE AND METHOD FOR PRINTING CONTAINERS

(71) Applicant: KHS GmbH, Dortmund (DE)

(72) Inventors: Martin Schach, Bochum (DE); Gyula Varhaniovszki, Pulheim (DE); Markus Reiniger, Mönchengladbach (DE)

(73) Assignee: KHS GmbH, Dortmund (DE)

( * ) Notice: Subject to any disclaimer, the term of this patent is extended or adjusted under 35 U.S.C. 154(b) by 50 days.

(21) Appl. No.: 15/525,652

(22) PCT Filed: Oct. 22, 2015

(86) PCT No.: PCT/EP2015/074439
§ 371 (c)(1),
(2) Date: May 10, 2017

(87) PCT Pub. No.: WO2016/074895
PCT Pub. Date: May 19, 2016

(65) Prior Publication Data
US 2017/0334215 A1    Nov. 23, 2017

(30) Foreign Application Priority Data

Nov. 10, 2014  (DE) .................. 10 2014 116 343
Nov. 11, 2014  (DE) .................. 10 2014 116 405

(51) Int. Cl.
*B41J 3/407* (2006.01)
*B41F 17/00* (2006.01)
(Continued)

(52) U.S. Cl.
CPC .......... *B41J 3/4073* (2013.01); *B41F 17/002* (2013.01); *B41F 17/18* (2013.01); *B65B 61/26* (2013.01);
(Continued)

(58) Field of Classification Search
CPC ........ B41J 3/4073; B41J 17/002; B41J 17/18; B65B 61/26; B65C 9/02; B65G 47/902; B65G 2201/0247
See application file for complete search history.

(56) References Cited

U.S. PATENT DOCUMENTS 4,314,524 A * 2/1982 Deguchi ............. B65G 47/902
                                                    118/416
8,070,244 B2 * 12/2011 Dumenil ................ B41F 13/46
                                                      347/2
(Continued)

FOREIGN PATENT DOCUMENTS

DE    10 2007 050 490    4/2009
DE    10 2009 058 212    6/2011
(Continued)

*Primary Examiner* — Matthew G Marini
*Assistant Examiner* — Marissa Ferguson-Samreth
(74) *Attorney, Agent, or Firm* — Occhiuti & Rohlicek LLP

(57) ABSTRACT

An apparatus for printing on containers includes a transport arm and a lift that cooperate to form a first container-transport device that moves a container at a container-loading position into a printing position. The transport arm is arranged on the lift and pivotable about a pivot axis thereof. The lift is axially displaceable and displaces the transport arm axially in relation to the pivot axis. At the printing position, a print head prints on the container.

18 Claims, 2 Drawing Sheets

(51) Int. Cl.
  *B41F 17/18* (2006.01)
  *B65G 47/90* (2006.01)
  *B65B 61/26* (2006.01)
  *B65C 9/02* (2006.01)

(52) U.S. Cl.
  CPC .............. *B65C 9/02* (2013.01); *B65G 47/902* (2013.01); *B65G 2201/0247* (2013.01)

(56) References Cited

U.S. PATENT DOCUMENTS

| | | | |
|---|---|---|---|
| 2002/0024544 A1* | 2/2002 | Codos | B41J 3/4073 347/8 |
| 2007/0157559 A1 | 7/2007 | Till | |
| 2012/0199021 A1* | 8/2012 | Till | B41J 3/4073 101/36 |
| 2015/0059600 A1* | 3/2015 | Heidrich | B41F 17/28 101/36 |
| 2015/0321486 A1* | 11/2015 | Palumbo | B41J 3/4073 347/37 |
| 2016/0136818 A1* | 5/2016 | Kitahara | B65G 47/90 414/222.07 |
| 2016/0184879 A1* | 6/2016 | Zulauf | B21D 43/05 72/405.09 |

FOREIGN PATENT DOCUMENTS

| | | | |
|---|---|---|---|
| DE | 10 2013 213 843 | 1/2015 | |
| DE | 10 2013 214 934 | 2/2015 | |
| DE | 10 2013 214 935 | 2/2015 | |
| EP | 1 260 469 | 11/2002 | |
| EP | 1 435 296 | 7/2004 | |
| EP | 2960057 | * 12/2015 | ............ B41F 16/008 |
| GB | 955 715 | 4/1964 | |
| JP | S582117 | 3/1983 | |
| WO | WO2015/036566 | 3/2015 | |

* cited by examiner

PRINTING DEVICE AND METHOD FOR PRINTING CONTAINERS

RELATED APPLICATIONS

This is the U.S. national stage under 35 USC 371 of international application PCT/EP2015/074439, filed on Oct. 22, 2015, which claims the benefit of the Nov. 10, 2014 priority date of DE102014116343.5 and the benefit of the Nov. 11, 2014 priority date of DE10204116405.9, the contents of which are herein incorporated by reference.

FIELD OF INVENTION

The invention relates to printing on containers.

BACKGROUND

It is often desirable to print on containers so that consumers will know what is inside the container without having to open it. A known way to print on a container is to use an inkjet printer. Known printing machines have a rotor that rotates around a vertical axis. The rotor's periphery has ink-jet printing stations disposed thereon.

It is also known to use a robot arm to position a container for printing.

SUMMARY

According to a first aspect, the invention relates to a device for printing on containers. The printing device comprises a print station having at least one print head, and a container-transport device that moves a container situated at a container-loading position from the container-loading position into a printing position. The print head is configured for printing the container at the printing position. In a typical embodiment, the print head is an inkjet print head.

The container-transport device comprises an axially displaceable lifting element and a transport arm that is arranged on the lifting element. The transport arm pivots about a pivot axis. It can also be displaced axially in relation to the pivot axis by the lifting element. As a result, the container can be moved with a lifting and pivoting movement from the container-loading position into the printing position.

The printing device thus offers a simple design for moving the container that is to be printed upon from the loading position to the printing position. This makes it possible to print on containers inexpensively. The small number of moving parts also makes it possible to precisely position the print head relative to the container. This promotes high printed-image quality.

According to one embodiment, the transport arm comprises a holding-and-centering unit for holding and centering the container. As a result, not only can the container be held in a fixed position relative to the transport arm, it can also be simultaneously centered so that, for example, during a rotational movement of the container about its vertical container axis relative to the print head, the container wall is always at a defined distance away from the print head.

According to one embodiment, the holding-and-centering unit is configured so that it suspends the container from a region of the container's mouth. The holding-and-centering unit, in some embodiments, comprises a contact piece that makes contact against the edge of the container opening. This contact piece can be conical to achieve the centering effect referred to above. A clamping piece of the holding-and-centering unit interacts with this contact piece. It grips the container by a lateral projection thereof, such as a neck ring, and presses with the container mouth against the contact piece. This ensures that the container is held securely suspended while being simultaneously centered. An advantage of this configuration is that, with the exception of its mouth region, the entirety of the container's surface is freely accessible and so can be printed upon.

According to one embodiment, the container-transport device comprises a drive for rotating the container about its vertical container axis. An example of such a drive is a servo motor. This enables the container to be rotated about its vertical container-axis relative to the print head to allow the peripheral side of the container wall to be printed upon.

According to one embodiment, the transport arm projects laterally away from the lifting element at a fixed angle. In particular, the lifting element is aligned vertically or substantially vertically and the transport arm projects at right angles, i.e. radially, away from the lifting element. This connection between the transport arm and the lifting element, which is rigid so as to maintain a constant angle, is advantageous because it reduces positioning inaccuracies of the container relative to the print head. This reduction promotes better printed image quality.

According to some embodiments, the lifting element is configured in the manner of a rod. The lifting element can, for example, be guided in a sleeve to obtain a more reliable guiding of the lifting element in the axial direction. The positioning inaccuracies of the container relative to the print head can again be reduced because of this. The lifting element is preferably aligned vertically or substantially vertically.

According to one embodiment, the lifting element can be displaced by a lifting device in the direction of the lifting element's longitudinal axis. In some embodiments, the lifting device includes a motorized drive, such as an electromagnetic linear drive. In other embodiments, the lifting device includes a servo motor acting on a threaded spindle or by a cam control. Other drives are also conceivable. Such drives achieve an exact positioning accuracy with a high repeatability of the lifting movement at the same time.

According to one embodiment, the transport arm is associated with a pivot drive by way of which the transport arm can be pivoted about the lifting element's longitudinal axis or about an axis running parallel to the lifting element's longitudinal axis. In some embodiments, the pivot drive comprises an electric motor, such as a servo motor. Such a pivot drive achieves automated pivot movement from the loading position to the printing position or from the printing position back to the loading position.

Some embodiments include a sensor. Such a sensor derives a measured variable that depends on a distance between a container to be printed upon and a print head in the region of the print station. In such embodiments, the measured variable is passed to a controller, which then activates the pivot drive of the transport arm such that a defined distance is maintained between the container wall to be printed and the print head. This makes it possible even for containers that are not rotationally symmetrical to be printed by the printing device, as the pivot position of the transport arm is suitably tracked.

According to one embodiment, the holding-and-centering unit is provided on the free end of the transport arm, which is at a distance away from the lifting element. In this case the pivoting of the transport arm can only bring about the moving of the container from the loading position to the printing position or from the printing position to the unloading position.

The lifting element is preferably arranged between the print station which has the at least one print head, and the loading/unloading position, i.e. the print station and the loading/unloading position are on opposite sides of the lifting element. Consequently the conveying of containers to or away from the print station can be effected simply by pivoting the transport arm.

Some embodiments include a holding device configured to accommodate a plurality of print heads. Such a holding device is movable, specifically in such a way that for the printing of the container, at least two of the print heads are moved into the printing position step-by-step in sequence. The term "printing position" is used in this context to mean a positional arrangement of the print head relative to the container wall so as to achieve a short distance, typically in the millimeter range, between the print head and the container wall. As a result, the print heads disposed on the holding device can be brought sequentially into an optimum position for the polychrome printing of a container.

According to one embodiment, the holding device is configured to be linearly displaceable. In particular, the holding device can be provided on a linear table. Linear tables are characterized by high positioning accuracy and high repeatability of linear movement. This promotes the quality of the printed image because accurate positioning of the individual parts of the printed image, which are generated by the respective print heads, is essential to achieve a sharp overall printed image. In alternative embodiments, the holding device is configured so that it pivots about a pivot axis.

According to one embodiment, the holding device can be moved in such a way that, for a print head change, a first print head is moved out of the printing position and another print head is moved into the printing position. Thus, a previously active print head is moved away from the container while another print head is moved towards the container to complete a change of the active print heads.

The holding device is preferably provided with a device for drying and/or setting the printing color or printing ink. This device can be used, for example, for an intermediate drying or pinning of a partial printed image or also for the final hardening, or curing, of the overall printed image. It is also possible for a plurality of such drying devices to be provided, for example between the print heads, in order to minimize the movements of the holding device.

According to one embodiment, printing, and in particular the polychrome printing, of the container is effected in such a way that the container remains at a fixed printing position and printing is performed by a plurality of chronologically sequential printing steps, with a change of print head taking place between two successive printing steps by moving the holding device. The movement of the print head alone relative to the container further enhances the print quality because possible inaccuracies arising as a result of the motion are avoided by the container's lack of movement.

According to one embodiment, at least two container-transport devices are provided which in chronologically alternate successive cycles one after the other effect a delivery of containers from the container loading position to the printing position, thereby achieving a greater throughput (number of printed containers per unit of time).

According to one embodiment, the container-transport devices are configured and activated in such a way that a first container is held by a first container-transport device at the printing position while a second container is picked up at the container loading position and/or set down at an unloading position by a second container-transport device. The time during which the first container is being printed is therefore used to feed or discharge the second container. The container-transport devices can be configured so that the first container-transport device, with a container provided on it, can move past the second container-transport device without colliding. This can be effected, for example, by traversing the container-transport devices vertically or radially relative to the respective pivot axis of the container-transport device. Other measures for the collision-free movement of the container-transport devices relative to one another are also conceivable.

According to another aspect, the invention relates to a method for printing containers using a print head, with a container situated at the container loading position being moved by way of a transport arm of a container-transport device from the container loading position into a printing position where it is printed upon. The container is moved by way of a lifting/pivoting movement from the container loading position into the printing position in such a way that the transport arm of the container-transport device is pivoted about a pivot axis and displaced axially relative to that pivot axis by an axially displaceable lifting element.

As used herein, "container" refers to all containers, in particular bottles, cans, etc.

For the purpose of the invention the expressions "substantially" or "around" mean variations from the respective exact value by ±10%, preferably by ±5% and/or variations in the form of changes insignificant for function.

Further embodiments, advantages and possible applications of the invention arise out of the following description of embodiments and out of the figures. All of the described and/or pictorially represented attributes whether alone or in any desired combination are fundamentally the subject matter of the invention independently of their synopsis in the claims or a retroactive application thereof. The content of the claims is also made an integral part of the description.

BRIEF DESCRIPTION OF THE FIGURES

The invention is explained in detail below through the use of embodiment examples with reference to the figures. In the figures.

DETAILED DESCRIPTION

Figure 1:
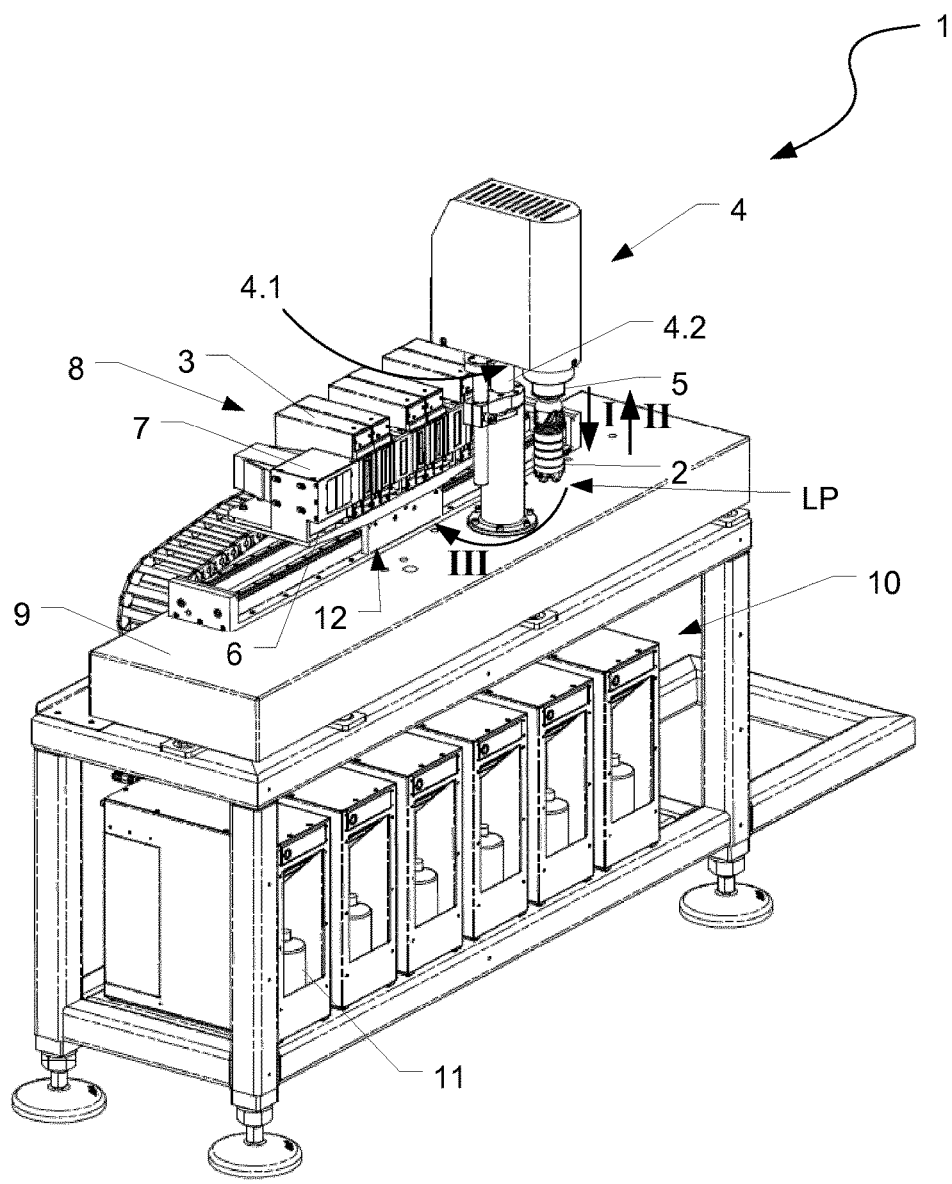
FIG. 1 shows a perspective view of a printing device.
Figure 2:
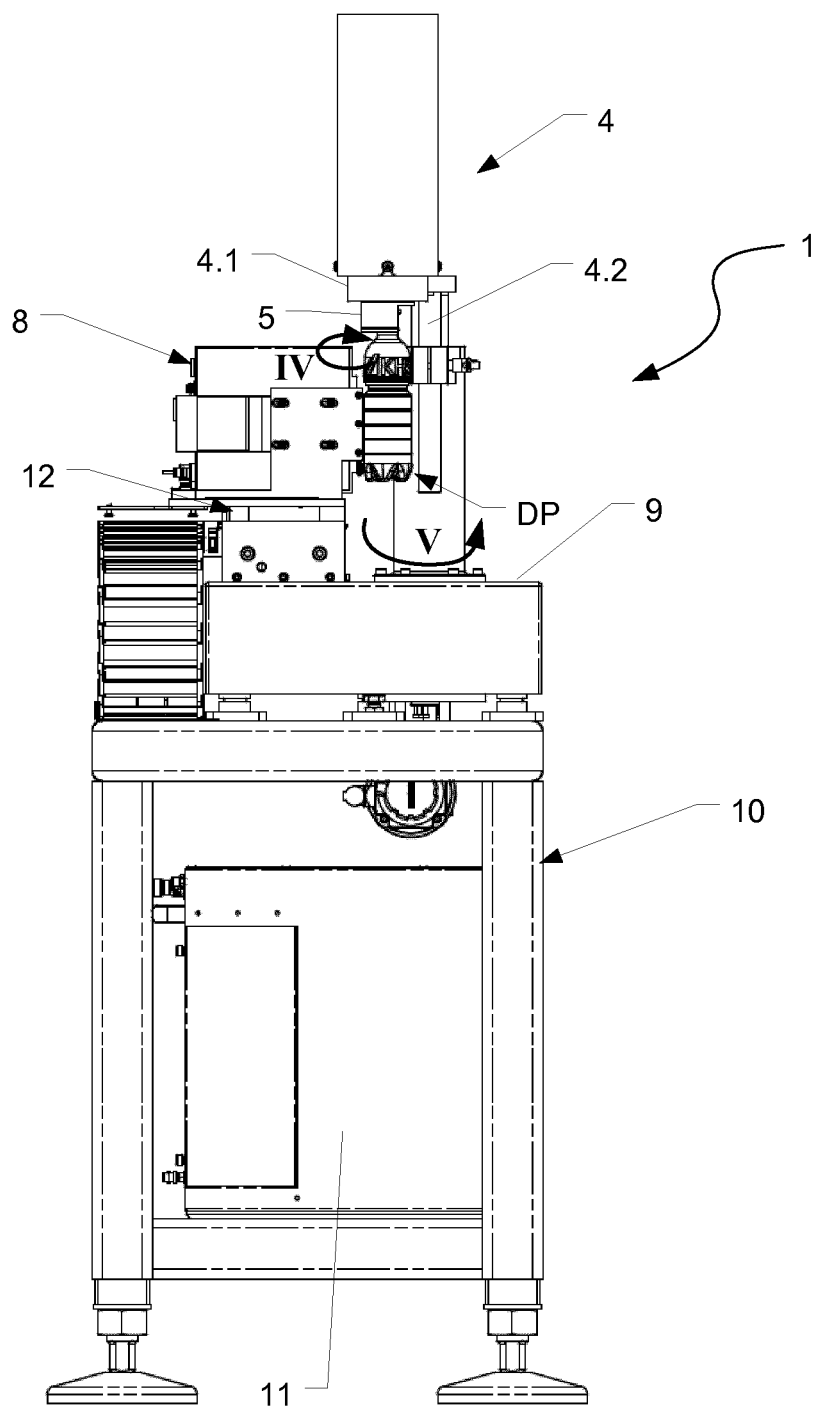
FIG. 2 shows a side view of the printing device from FIG. 1.

FIGS. 1 and 2 show a printing device 1 for printing on a container 2. The printing device 1 comprises a print station 8 that uses a digital direct-printing method to print upon a container wall of a container 2. The printing device 1 is typically used for printing on small batches of containers or for producing sample containers. In some embodiments, the print station 8 is a single-print station.

In the illustrated embodiment, the printing device 1 is arranged on a frame that includes a container-transport device 4. The container-transport device 4 picks up a container 2 at a container-loading position LP and conveys that container 2 to a printing position DP.

The printing position DP has at least one print station 8 that has at least one print head 3 for printing on an outside of the container's wall. In the depicted embodiment, the print station 8 has a plurality of print heads 3, In a typical embodiment, the print heads 3 are digital print-heads that can carry out ink-jet printing.

The container-transport device 4 also has a transport arm 4.1 and a lifting element 4.2. The lifting element 4.2 can be configured entirely, or at least in some sections, as a rod. In some embodiments, the lifting element 4.2 extends vertically or substantially vertically. In other embodiments, the lifting element 4.2 projects up away from a mounting surface 9 of the printing device 1.

The lifting element 4.2 is displaceable along a longitudinal axis thereof. It is therefore possible for a drive to change the distance between a free end of the lifting element 4.2, which faces away from the mounting surface 9, and the mounting surface 9. Examples of suitable drives include hydraulic drives, pneumatic drives, drives that rely on cam control, and electromagnetic linear drives.

The transport arm 4.1, which projects away at an angle from the lifting element 4.2, is provided on the free end of the lifting element 4.2 projecting away from the mounting surface 9. In particular, a rigid angle-coupling can exist between the lifting element 4.2 and the transport arm 4.1. In some embodiments, the transport arm 4.1 projects laterally away from the lifting element 4.2 at a fixed angle. Among these are embodiments in which the transport arm 4.1 projects away from the lifting element 4.2 at a right angle.

A pivot drive pivots the transport arm 4.1 about a pivot axis, and in particular, about a vertical pivot axis. In some embodiments, the pivot axis is the longitudinal axis of the lifting element 4.2. In other embodiments, the pivot axis is parallel to the longitudinal axis of the lifting element 4.2. With the transport arm 4.1 being aligned horizontally, or substantially horizontally, it becomes possible to pivot the transport arm 4.1 so that it moves along a horizontal or substantially horizontal plane.

A holding-and-centering unit 5 at a free end of the transport arm 4.1 faces away from the lifting element 4.2. The holding-and-centering unit 5 picks up and holds a container 2 that is to be printed upon. It does so by suspending the container 2 from a region of its mouth and suspending.

In some embodiments, the holding-and-centering unit 5 includes a contact piece that is brought into contact with the edge of the container's opening. Although a variety of configurations are possible, in typical embodiments, the contact piece is either a centering piece or a centering cone.

The holding-and-centering unit 5 also has a clamping piece that at least partially encompasses a container's neck ring. To pick up and hold a container, the holding-and-centering unit 5 moves the clamping piece relative to the contact piece so that the clamping piece presses the container 2 up against the contact piece by an edge near the container's opening.

The holding-and-centering unit 5 is coupled to a drive that rotates a container 2 that has been picked up by the holding-and-centering unit 5. In some embodiments, the drive is a servo motor that rotates the contact piece and the clamping piece. This rotates a container 2 that has been picked up at the holding-and-centering unit 5 about a vertical or substantially vertical axis of rotation that is preferably parallel to the longitudinal axis of the lifting element 4.2.

The container-transport device 4 executes a lifting and pivoting movement to move the container 2 from the container-loading position LP into the printing position DP. At the container-loading position LP, a container-conveying device feeds containers. Examples of a container conveying device include a linear conveyor and a transport star wheel. Alternatively, it is possible to manually feed containers into the container-loading position LP.

The printing process for printing on a container begins with picking up the container 2 at the loading position LP. This is carried out by lowering the holding-and-centering unit 5 down onto the container's mouth and then by having the holding-and-centering unit 5 grip the container 2 in the region of its mouth as previously described (arrow I). The holding-and-centering unit 5 is lowered down onto the container mouth by displacing the lifting element 4.2 along the latter's longitudinal axis.

Next, the lifting element 4.2 is displaced in the opposite direction so that the holding-and-centering unit 5 lifts the container it has just gripped (arrow II).

The transport arm 4.1 is then pivoted about the lifting element's longitudinal axis. This moves the container from the loading position LP and into the printing position DP (arrow III).

At this printing position 2, a print head 3 prints on the container 2 as the container 2 rotates about its vertical container-axis (arrow IV). In the case of a rotationally-symmetric container 2, the container 2 preferably remains at a fixed spatial position during this printing process. In such a case, the container-transport device 4 refrains from pivoting about the vertical axis of the lifting element 4.2.

In the case of a rotationally asymmetric container 2, as the container 2 rotates, the transport arm 4.1 pivots about the longitudinal axis of the lifting element 4.2 or about an axis parallel to that axis. As a result, the distance between the container's wall and the print head 3 can remain at a desired distance.

A measurement-and-control system controls the pivoting of the transport arm 4.1 in an attempt to maintain the distance between the print head 3 and the container wall. The measurement-and-control system comprises a sensor that measures the distance between the container wall and the print head 3. Based on this measurement, the drive pivots the transport arm 4.1 such that the distance between the container wall and the print head 3 remains constant or approximately constant as the print head 3 prints upon the container 2.

Certain embodiments print multiple colors on the container. Such embodiments include a holding device 6 that holds plural print heads 3 at the print station 8. The print heads 3 are aligned parallel with one another. As a result, ink coming from ail print heads 3 arrives at the container from the same direction.

When printing directly on a container 2, it is important that an active print head, i.e. a print head that is currently in the process of printing upon the container 2, adopt a position relative to the container 2 in which that the print head comes to rest at a short distance away from the container wall. A suitable distance is between one millimeter and three millimeters. This position is referred to herein as the print head's "printing location."

During the printing process, it is often the case that several print heads 3 at the print station 8 will be used to print upon the container 2 as the container 2 sits in the printing position DP. These print heads 3 take turns printing. Because the print heads 3 print sequentially upon the container 2, it is necessary to move a print head 3 out of the printing location after it is done printing and to move another print head 3 into that printing location to take its place. This movement is referred to below as a "print-head change."

To carry out a print-head change, the holding device 6 moves, either by linear translation or by pivoting. Since the holding device 3 carries the print heads 3, the print heads 3 also move.

In the illustrated embodiment, a linear table 12 supports the holding device 6. This linear table 12 moves along a straight line, thus moving the holding device 6 along the straight line. A suitable linear table 12 is a high-resolution linear table having a reproducible repeat accuracy in the range of a hundredth of a millimeter. This resolution promotes accurate placement of differently colored printed images that are to be arranged above one another, thus promoting high print-quality.

The holding device 6 can carry function elements other than print heads 3. In some embodiments, the holding device 6 carries a drying device 7 for drying or setting the printing color or printing ink. A suitable drying device 7 includes a UV lamp.

A supply space 10 accommodates storage tanks 11 beneath the print station 8, These storage tanks 11 store operating media, such as ink. Flexible supply lines bring this operating media from the storage tanks 11 up to the print heads 3 or other function elements. These flexible supply lines lead to the rear side of the holding device 6, which faces away from the printing position DP.

During the printing operation, a holding-and-centering unit 5 holds a container 2 to be printed upon at the printing position DP. A print head 3 is then positioned at the printing location. Then, as the print head 4 prints, the container 2 is moved relative to its print head, for example by being rotated about its vertical container-axis.

Once the print head 3 is done printing, a print-head change takes place. This includes moving the initially active print head 3 from the printing location and moving another print head 3 in its place.

With the new print head in place, further movement of the container 2 relative to the new print head 3 takes place. As the container moves, the print head 3 prints another image in another printing color. This procedure repeats until all the required print heads 3 have had their turn at printing, This results in successive application of printed images in different printing colors to create a complete printed image having many colors. In some embodiments, pinning occurs during an interval between moving one print head 3 out of the way and moving the new print head 3 in its place. A suitable drying device 7 between successive print heads 3 carries out pinning.

Once all printed images have been applied, a curing step takes place. A suitable drying device 7 for carrying out this curing step is disposed at one end of the holding device 6. Once all the printed images have been applied to the container 2, the drying device 7 carries out the final hardening of the complete printed image.

On completion of printing, a pivoting movement of the transport arm 4.1 moves the container 2 into an unloading position (arrow V). The lifting element 4.2 than lowers the container 2 and sets it down on the unloading position. Once the container 2 is safely at the unloading position, the holding-and-centering unit 5 releases it.

In some embodiments, the unloading position is the same as loading position LP. In other embodiments, the loading position LP and the unloading position are at different places. The container 2, now having been printed upon, is then conveyed away, either manually or by a suitable conveyor.

Some embodiments have at least two container-transport devices 4. These container-transport devices 4 take turns feeding containers 2 from the container-loading position LP to the printing position DP or back to the unloading position. This means that while one container-transport device 4 holds a container 2 during printing, the other container-transport device 4 can be busy doing something else, such as conveying a container that has just been printed upon to the unloading position or picking up a new container at the loading position LP.

The container-transport devices 4 are positioned to avoid collisions between each other as well as between the holding-and-centering units 5 and any containers 2 being carried. In some embodiments, the relative movement can be brought about by a vertical offset of the transport; arms 4.1, or alternatively by a radial relative movement of the holding-and-centering units 5 provided on the transport arms 4.1. Other measures for the collision-free relative movement of the container-transport devices 4 are also conceivable.

The invention has been described hereinbefore by reference to embodiments. Variations or modifications are possible without departing from the inventive concept underlying the invention, as defined in the appended claims.

The invention claimed is:

1. An apparatus for printing on a container, said apparatus comprising a plurality of print heads, said plurality of print heads including a first print head and a second print head, a holding device that accommodates said plurality of print heads, a lift, and a transport arm, wherein said holding device is configured to be linearly displaceable, wherein said transport arm and said lift cooperate to form a first container-transport device that moves said container from a container-loading position to a printing position, wherein said transport arm is arranged on said lift, wherein said transport arm is pivotable, wherein said lift is axially displaceable, wherein said lift displaces said transport arm axially in relation to said pivot axis, wherein said first print head prints on said container once said container has been brought to said printing position, and wherein movement of said holding device causes said first print head to move away from said printing position and causes said second print head to move toward said printing position.

2. The apparatus of claim 1, wherein said transport arm comprises a holding-and-centering unit for holding and centering said container.

3. The apparatus of claim 1, wherein said container comprises a mouth, and wherein said apparatus further comprises a holding-and-centering unit configured to suspend said container from a region of said mouth.

4. The apparatus of claim 1, wherein said first container-transport device rotates said container about a vertical container-axis thereof.

5. The apparatus of claim 1, wherein said transport arm projects away from said lift laterally at a fixed angle.

6. The apparatus of claim 5, wherein said lift comprises a rod.

7. The apparatus of claim 5, wherein said lift is aligned vertically.

8. The apparatus of claim 5, wherein said lift is displaceable along a longitudinal axis thereof.

9. The apparatus of claim 5, wherein said transport arm is configured to be pivoted about one of a longitudinal axis of said lift and an axis parallel to said longitudinal axis.

10. The apparatus of claim 5, wherein said holding-and-centering unit is on a free end of said transport arm, and wherein said free end faces away from said lift.

11. The apparatus of claim 1, wherein said holding device can be moved to cause different print heads to be at said printing position at different times.

12. The apparatus of claim 1, further comprising a drying device provided on said holding device, said drying device configured to one of dry and set a printing ink deposited by a print head from said plurality of print heads.

13. The apparatus of claim 1, said apparatus being configured for polychrome printing in which said container remains fixed at said printing position while a sequence of different printing heads, each of which prints one color, is brought to said printing position to print on said container, said printing heads being brought in sequence one after the other.

14. The apparatus of claim 1, wherein said first container-transport device possesses structure that enables operation in chronologically alternate cycles such that, after said first container-transport device has brought a first container from said container-loading position to said printing position, said first container-transport device remains idle while a second container is brought from said container-loading position to said printing position.

15. The apparatus of claim 14, wherein said first container-transport device has a structure that enables said first container to be held at said printing position by said first container-transport device while said second container is being picked up at said container-loading position.

16. The apparatus of claim 14, wherein said first container-transport device possesses structure that enables said first container-transport device to be controlled such that said first container is held at said printing position by said first container-transport device while said second container is being set down at a container-unloading position.

17. The apparatus of claim 1, wherein said print heads are held on said holding device, wherein said holding device, as a result of movement thereof, prevents one of said print heads from printing on said container, wherein said first container-transport device executes a lifting movement and a pivoting movement when moving a container toward said print heads, wherein said transport arm executes said pivoting movement in a horizontal plane about a vertical pivot axis that is perpendicular to a linear displacement of said holding device, wherein said lift executes said lifting movement, said lift being configured such that, when displaced vertically, said lift lifts said transport arm during movement of a container toward said print heads, and wherein said print heads print on a container while said container rotates about a vertical axis thereof.

18. A method comprising using a transport arm to move a container situated at a loading position into a printing position, and, using a print-head, printing on said container while said container is at said printing position, wherein using said transport arm comprises pivoting said transport arm about a pivot axis and axially displacing said transport arm along said pivot axis.

* * * * *